(12) United States Patent  
Cheng et al.

(10) Patent No.: US 11,678,177 B2  
(45) Date of Patent: Jun. 13, 2023

(54) DUAL-LINK WIRELESS AD HOC NETWORK AND SECURITY DEFENSE METHOD IN EMERGENCY SCENE

(71) Applicant: XIDIAN UNIVERSITY, Xi'an (CN)

(72) Inventors: Wenchi Cheng, Xi'an (CN); Chunhua Chen, Xi'an (CN); Muyao Wang, Xi'an (CN)

(73) Assignee: Xidian University, Xi'an (CN)

( * ) Notice: Subject to any disclaimer, the term of this patent is extended or adjusted under 35 U.S.C. 154(b) by 304 days.

(21) Appl. No.: 17/158,590

(22) Filed: Jan. 26, 2021

(65) Prior Publication Data

US 2022/0022031 A1 Jan. 20, 2022

(30) Foreign Application Priority Data

Jul. 20, 2020 (CN) .......................... 202010697039.9

(51) Int. Cl.
*H04W 12/00* (2021.01)
*G06N 3/04* (2023.01)
(Continued)

(52) U.S. Cl.
CPC ............ *H04W 12/009* (2019.01); *G06N 3/04* (2013.01); *G06N 3/08* (2013.01); *H04L 9/3249* (2013.01)

(58) Field of Classification Search
CPC . H04W 12/009; H04W 12/03; H04W 12/088; H04W 12/108; H04W 12/121;
(Continued)

(56) References Cited

U.S. PATENT DOCUMENTS

| 8,711,818 B2* | 4/2014 | Rajappan | .............. H04L 47/724 |
| | | | 370/338 |
| 2005/0059379 A1* | 3/2005 | Sovio | ...................... H04L 67/04 |
| | | | 455/410 |

(Continued)

FOREIGN PATENT DOCUMENTS

| CN | 110149373 B | * | 1/2022 | ............. H04L 63/10 |
| KR | 20110122685 A | * | 11/2011 | ............ H04W 12/12 |

*Primary Examiner* — Michael R Vaughan  
*Assistant Examiner* — Abdullah Almamun  
(74) *Attorney, Agent, or Firm* — Vorys, Sater, Seymour and Pease LLP; Rex W. Miller, II

(57) ABSTRACT

Disclosed is a dual-link wireless ad hoc network and a security defense method in an emergency scene, aiming at comprehensively improving its security defense capability. The method comprises: sending, by a source node, the secret key and other messages which are not security defense messages through the second link; detecting, by a destination node, abnormal messages from the acquired valid messages after matching with abnormal message feature library, filtering the abnormal messages out, and quickly broadcasting the features of new abnormal messages through the first link; checking, by a new node to be added to the network, the identity and hardware state, authorizing the new node without abnormality, and broadcasting the authorization result information through the first link; adding, by other nodes receiving the security defense messages, the features of the new abnormal messages to their own abnormal message feature library, and allowing the entry of the new node.

5 Claims, 4 Drawing Sheets

(51) Int. Cl.
*G06N 3/08* (2023.01)
*H04L 9/32* (2006.01)

(58) Field of Classification Search
CPC ........... H04W 84/18; G06N 3/04; G06N 3/08; H04L 9/3249; H04L 9/0631; H04L 9/3247; H04L 9/0825; H04L 63/1441; H04L 63/1416
See application file for complete search history.

(56) References Cited

U.S. PATENT DOCUMENTS

| | | | |
|---|---|---|---|
| 2014/0140204 A1* | 5/2014 | Lynar | H04L 45/28 370/225 |
| 2014/0347978 A1* | 11/2014 | Kim | H04W 40/12 370/225 |
| 2016/0226890 A1* | 8/2016 | Harang | H04L 63/1408 |

* cited by examiner

DUAL-LINK WIRELESS AD HOC NETWORK AND SECURITY DEFENSE METHOD IN EMERGENCY SCENE

CROSS-REFERENCE TO RELATED APPLICATIONS

This application claims priority to Chinese Patent Application Number 202010697039.9, filed Jul. 20, 2020, the disclosure of which is incorporated herein by reference.

TECHNICAL FIELD

The present disclosure belongs to the technical field of network security, and relates to a wireless ad hoc network and a security defense method, in particular to a dual-link wireless ad hoc network and a security defense method in an emergency scene.

BACKGROUND

In case of man-made or natural sudden emergency, it is necessary to temporarily build an emergency communication network to ensure rescue and necessary communication. With the application of emergency communication in more and more scenes, it has become an urgent problem for emergency communication about how to better defend. Wireless ad hoc network has been widely used in emergency communication because it does not depend on communication infrastructure and can be networked at any time. Wireless ad hoc network is a decentralized and distributed network, and the network topology changes randomly. Each node in the network can act as a mobile terminal with transceiver function and a router with forwarding function at the same time. Nodes can be disconnected and accessed at any time, and communication paths between nodes may change at any time. Typical wireless ad hoc networks include Ad Hoc networks, wireless sensor networks and wireless mesh networks. Attackers can bring great security risks to the network through malicious acts in a wireless ad hoc network such as forging identity, tampering with information and sending abnormal messages. Although it is very convenient to build a wireless ad hoc network, since the information conveyed in the emergency scene is often important information and key disaster command information, once an attacker commits malicious acts on the network to affect the transmission of information in the network, it will delay the best time for emergency response and cause serious consequences for the normal development of emergency work. Therefore, it is very important to improve the security defense capability of the wireless ad hoc network in the emergency scene.

For example, a Chinese patent entitled "A Method and a Device for Intrusion Detection in Mobile Self-organized Network Based on Deep Learning", with authorized publication No. CN104935600B, discloses a method and a device for intrusion detection in mobile self-organized network based on deep learning. The intrusion detection device according to the present disclosure comprises a data acquiring module, a data fusing module, a preprocessing module, a storage module, an intrusion detection module and a response alarm module. The intrusion detection method is to extract the network behavior features of captured wireless data packets; after learning the network behavior features by means of deep learning, establish a deep neural network model to express network behavior; use the training set of network intrusion behavior features to train the deep neural network's misuse detection model, and obtain the expression of network intrusion behavior; use the training set of network normal behavior features to train the deep neural network's abnormal detection model, and obtain the expression of network normal behavior; and input, by the deep neural network abnormal detection model, the network behavior feature vector which is judged as abnormal into the deep neural network misuse detection model for recognition. If the recognition result is consistent with the known intrusion type, an alarm is displayed; otherwise, the abnormal network behavior feature vector is stored as a new network intrusion feature vector, and the deep neural network misuse detection model is trained. When this kind of intrusion occurs again, it can be recognized immediately.

According to the present disclosure, the misuse detection model and the abnormal detection model of the deep neural network are adopted, so that the detection rate is improved, and the response alarm module is started after abnormal data is detected, thereby further improving the security defense performance of the mobile ad hoc network. However, when the intrusion detection device captures the abnormal data in the network, the alarm response module is started after the detection of the deep neural network and determining that it is abnormal, and the alarm response information is transmitted to the node invaded by the abnormal data through the wireless link. In this process, the transmission time caused by the difference in physical location and the redundant and inefficient wireless link due to the transmission of all kinds of information may cause the alarm response information to fail to arrive in time, resulting in the situation that the node has been invaded. There is only one intrusion detection device in the mobile ad hoc network, and the device is independent of other nodes in the network. Once the device is attacked by malicious people, it will cause the paralysis of the whole network security defense function and affect the normal communication; according to the present disclosure, only the intrusion detection rate is improved, and the situation that data is tampered in the transmission process and malicious people forge identities to be added to the network is not taken into account.

SUMMARY

The object of the present disclosure is to overcome the shortcomings of the prior art described above, and provide a dual-link wireless ad hoc network and a security defense method in an emergency scene, aiming at comprehensively improving the security defense capability of the wireless ad hoc network in an emergency scene through rapid security defense, distributed intrusion detection and perfect security defense functions.

In order to achieve the above object, the technical scheme adopted by the present disclosure is as follows:

a dual-link wireless ad hoc network in an emergency scene, comprising M mobile nodes, where N={$n_1, n_2, \ldots, n_i, \ldots, n_M$}, M≥3, wherein $n_i$ represents the i-th mobile node, 1≤i≤M, each mobile node serves as both a source node and a destination node of other mobile nodes, as well as an intermediate node between two mobile nodes, and a first link for transmitting security defense messages and a second link for transmitting other messages not belonging to security defense messages, public keys and encrypted AES keys are provided between any two mobile nodes;

each mobile node is loaded with a security defense unit, which comprises a private key, a public key, an RSA encryption module, an RSA decryption module, a Hash module, a digital signature module, an AES key, an AES encryption module, an AES decryption module, a digital signature verification module, an abnormal message feature library, a feature matching module, a TCP/IP filter module, an S.M.A.R.T module, a supervision engine module and a special broadcast queue module, wherein:

the RSA encryption module is configured to encrypt the AES key;

the RSA decryption module is configured to decrypt the encrypted AES key;

the Hash module is configured to acquire message digest of the message;

the digital signature module is configured to sign the message digest;

the AES encryption module is configured to perform AES encryption on the message;

the AES decryption module is configured to decrypt the AES encrypted message with the digital signature;

the digital signature verification module is configured to strip the digital signature on the message; decrypt the signature of the digitally signed message digest; and verify whether the message digest that has been decrypted its signature is the same as the message digest of the decrypted message stripped of the digital signature which is acquired by the Hash module;

the abnormal message feature library is configured to store a plurality of abnormal message features;

the feature matching module is configured to match the message with the abnormal message features in the abnormal message feature library;

the TCP/IP filter module is configured to filter out abnormal messages;

the S.M.A.R.T module is configured to monitor the hardware state of the new node to be added to the dual-link wireless ad hoc network in the emergency scene;

the supervision engine module is configured to judge the message received by the destination node and unsuccessfully matched with the feature matching module; add the features of abnormal messages which are unsuccessfully matched with the feature matching module to the special broadcast queue module and the abnormal message feature library loaded on the destination node; check the identity and hardware state of the new node to be added to the dual-link wireless ad hoc network in the emergency scene; authorize the new node without abnormality; and add authorization result information to the special broadcast queue module loaded on the destination node;

the special broadcast queue module is configured to encapsulate the features of abnormal messages which are unsuccessfully matched with the feature matching module and the authorization result information into security defense messages, and broadcast the security defense messages to all mobile nodes except the destination node in the dual-link wireless ad hoc network in the emergency scene through the first link.

According to the dual-link wireless ad hoc network in an emergency scene, the hardware state of the new node to be added to the dual-link wireless ad hoc network in the emergency scene monitored by the S.M.A.R.T module refers to monitoring whether the new node is invaded and whether there is hardware failure.

A security defense method for a dual-link wireless ad hoc network in an emergency scene, comprising the steps of:

(1) sending, by a source node $n_i$, a secret key to its destination node $n_j$, wherein:

the RSA encryption module loaded on the source node $n_i$ encrypts the AES key Z through a private key Y of $n_i$ to obtain the encrypted AES key, and sends Z1 and the public key X of the source node $n_i$ to the destination node $n_j$ through the second link, wherein $1 \leq i \leq M$, $1 \leq j \leq M$, $i \neq j$;

(2) sending, by the source node $n_i$, a message to its destination node $n_j$, wherein:

(2a) the Hash module loaded on the source node $n_i$ calculates the message A to be sent by the source node $n_i$, and takes the calculated hash value as the message digest B of the message A;

(2b) the digital signature module loaded on the source node $n_i$ signs the message digest B through the private key Y of the source node $n_i$ to obtain a digital signature C of B, and attaches the digital signature C to the message A to obtain the message D with the digital signature;

(2c) the AES encryption module loaded on the source node $n_i$ encrypts D through the AES key Z of the source node $n_i$ to obtain an AES encrypted message E;

(2d) if the AES encrypted message E is a security defense message, the source node $n_i$ sends the message to the destination node $n_j$ through the first link; if the AES encrypted message E is another message, the source node $n_i$ sends the message to the destination node $n_j$ through the second link; in the transmission process, if the destination node $n_j$ is not in the communication range of the source node $n_i$, the message is forwarded through an intermediate node;

(3) acquiring, by the destination node $n_j$, the valid message, wherein:

(3a) the destination node $n_j$ receives the encrypted AES key Z1 sent by the source node $n_i$, the public key X of the source node $n_i$ and the AES encrypted message E;

(3b) the RSA decryption module loaded on the destination node $n_j$ decrypts the encrypted AES key Z1 through the public key X of the source node $n_i$ to obtain the decrypted AES key Z2;

(3c) the AES decryption module loaded on the destination node $n_j$ decrypts the AES encrypted message E through Z2 to obtain the AES decrypted message E';

(3d) the digital signature verification module loaded on the destination node $n_j$ strips the AES decrypted message E' to obtain the message D' and the digital signature C' of E';

(3e) the digital signature verification module loaded on the destination node $n_j$ decrypts the digital signature C' of E' through the public key X of the source node $n_i$ to obtain message digest P;

(3f) the Hash module loaded on the destination node $n_j$ calculates the message D' and takes the calculated hash value as the message digest Q;

(3g) the digital signature verification module loaded on the destination node $n_j$ judges whether the message digest P is the same as the message digest Q, if so, the message sent by the source node $n_i$ is consistent with the message received by $n_j$, that is, the message received by $n_j$ is a valid message, otherwise, the message received by $n_j$ is an invalid message;

(4) filtering, by the destination node $n_j$, the abnormal message, wherein:

(4a) the feature matching module loaded on the destination node $n_j$ matches the valid message with the abnormal message features in the abnormal message feature library, if they match successfully, the valid message is an abnormal message, and the abnormal message is filtered out to realize the defense against the abnormal message, otherwise, step (4b) is executed;

(4b) the supervision engine module loaded on the destination node $n_j$ judges whether the valid message is normal through deep learning algorithm, if so, the valid message is a normal message, otherwise, the valid message is a new abnormal message, the features of the new abnormal message are added to the special broadcast queue module loaded on the destination node $n_j$ and the abnormal message feature library, and the new abnormal message is filtered out at the same time to realize the defense against the new abnormal message;

(5) expanding, by the destination node $n_j$, the abnormal message feature library, wherein:

after receiving the normal message which is the security defense message in step (4b), the destination node $n_j$ adds the abnormal message features in the security defense message to the abnormal message feature library loaded on the destination node $n_j$;

(6) checking, by the new node to be added to the dual-link wireless ad hoc network in the emergency scene, its own security, wherein:

the new node to be added to the dual-link wireless ad hoc network in the emergency scene is loaded with a security defense unit; its own hardware state is monitored by the S.M.A.R.T module to obtain the hardware state results of whether it is invaded and whether there is hardware failure; the supervision engine module checks whether its own identity and the hardware state monitored by the S.M.A.R.T module are normal. If so, it is authorized by the supervision engine module, and the authorization result information is added to the special broadcast queue module loaded on the new node through the supervision engine module. Otherwise, the new node is refused to be added to the network to realize the defense against the new node with abnormality to be added to the dual-link wireless ad hoc network in the emergency scene;

(7) sending, by the new node to be added to the dual-link wireless ad hoc network in the emergency scene, a security defense message to M mobile nodes, wherein:

the new node to be added to the dual-link wireless ad hoc network in the emergency scene is taken as a source node, and its own encrypted AES key is acquired according to the method in step (1). The encrypted AES key and its own public key are sent to M mobile nodes of the dual-link wireless ad hoc network in the emergency scene through the second link, and its own AES encrypted security defense message is acquired according to the method in step (2) at the same time, and is sent to M mobile nodes of the dual-link wireless ad hoc network in the emergency scene through the first link;

(8) acquiring, by M mobile nodes of the dual-link wireless ad hoc network in the emergency scene, the security defense message sent by the new node, wherein:

M mobile nodes of the dual-link wireless ad hoc network in the emergency scene acquire the valid message sent by the new node according to the method in step (3), and judge whether the valid message is a normal message, an abnormal message or a new abnormal message according to the method in step (4). If the valid message is an abnormal message, the abnormal message is filtered out. If the valid message is a new abnormal message, the features of the new abnormal message are added to the special broadcast queue module loaded on M mobile nodes and the abnormal message feature library, and the new abnormal message is filtered out at the same time. Otherwise, after the authorization result information of the new node in the normal message sent by the new node which is a security defense message is acquired, the new node is allowed to be added to the dual-link wireless ad hoc network in the emergency scene, and the dual-link wireless ad hoc network in the emergency scene of M+1 mobile nodes including the new node is obtained.

Compared with the prior art, the present disclosure has the following advantages.

Firstly, in the dual-link wireless ad hoc network in the emergency scene constructed by the present disclosure, the first link for transmitting security defense messages and the second link for transmitting other messages not belonging to security defense messages, public keys and encrypted AES keys are provided between any two mobile nodes, wherein the first link is independent of the second link and has the characteristics of light weight and good management, so that the security defense message uniquely transmitted thereon can be quickly transmitted to other nodes. It not only avoids the defects of transmission redundancy and inefficiency caused by transmitting all information through a single link in the prior art, but also other nodes can quickly add abnormal message features to their abnormal message feature library after receiving security defense messages, so that other nodes can directly filter out the abnormal messages of malicious people when the abnormal messages arrive, which enhances the filtering ability of nodes and the mutual cooperation, and enables the dual-link wireless ad hoc network in the emergency scene to carry out rapid security defense.

Secondly, because the feature matching module and the supervision engine module in the security defense unit loaded on each mobile node can feed back the information to the TCP/IP filter module in the security defense unit in time after detecting the abnormal message, and filter it out, the problem that alarm information is invalid due to transmission delay caused by different physical positions of the alarm response module in the node and intrusion detection device in the prior art, and the problem that the security defense ability of the whole network will be paralyzed once a single intrusion detection device is broken, are avoided, so that the dual-link wireless ad hoc network in the emergency scene has the capability of quick response and distributed intrusion detection, which enhances the invulnerability of the network and improves the security defense capability.

Thirdly, according to the present disclosure, because the RSA encryption module, the AES encryption module and the digital signature module in the security defense unit loaded on each mobile node can improve the anti-counterfeiting performance of the message; the S.M.A.R.T module can monitor the hardware state of the new node to be added to the dual-link wireless ad hoc network in the emergency scene; the supervision engine module can check the identity and hardware state of the new node, which overcomes the defect that only abnormal data can be detected in the prior art, so that the dual-link wireless ad hoc network in an emergency scene has a more complete security defense capability and flexibly responds to various unexpected security situations.

DETAILED DESCRIPTION

The present disclosure will be described in further detail with reference to the drawings and specific embodiments.

Figure 1:
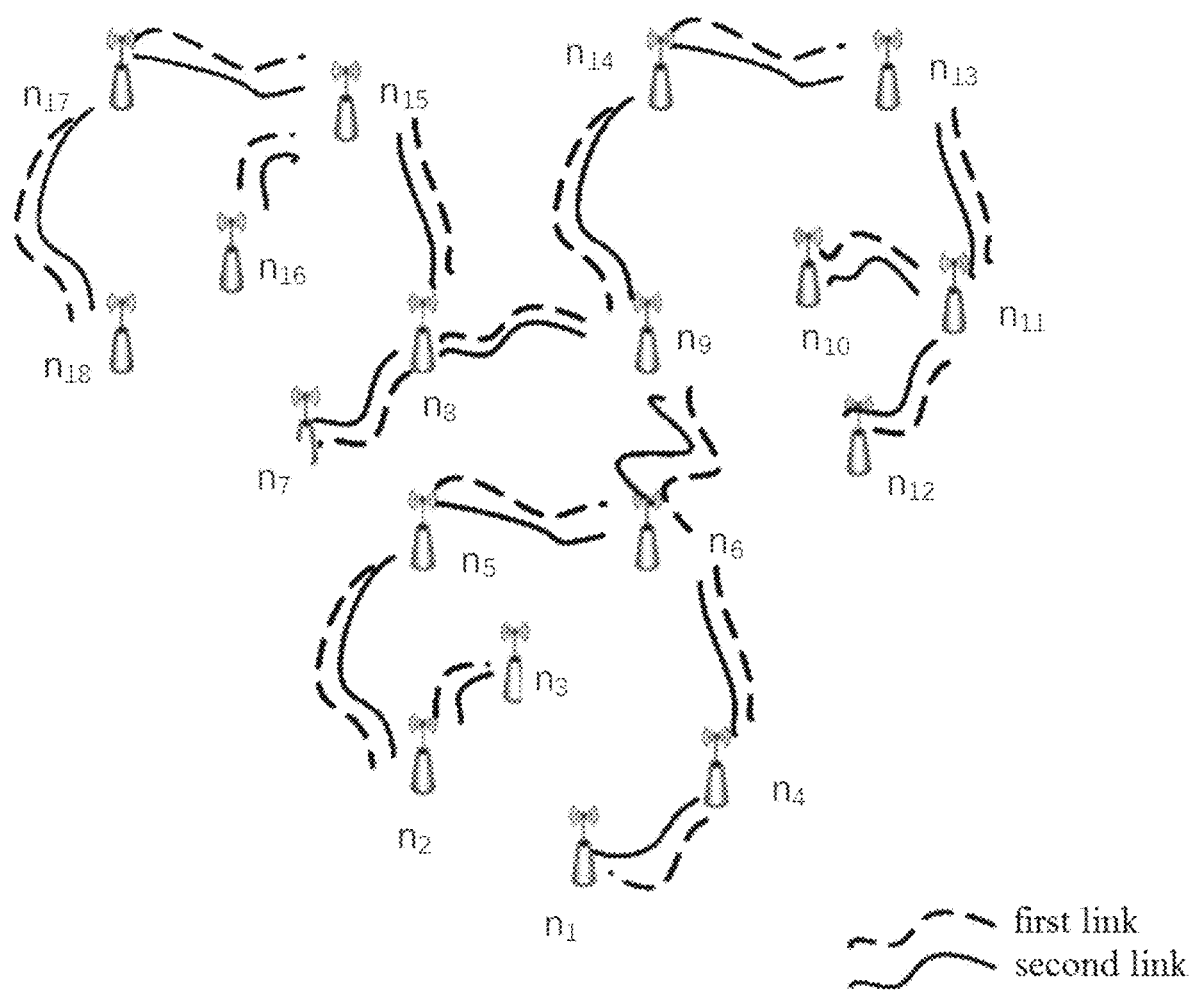
FIG. 1 is a schematic structural diagram for a dual-link wireless ad hoc network in an emergency scene according to the present disclosure.

With reference to FIG. 1, a dual-link wireless ad hoc network in an emergency scene includes: M mobile nodes, where $N=\{n_1, n_2, \ldots, n_i, \ldots, n_M\}$, $M \geq 3$, wherein $n_i$ represents the i-th mobile node, $1 \leq i \leq M$. In this embodiment, M=18, each mobile node serves as both a source node and a destination node of other mobile nodes, as well as an intermediate node between two mobile nodes, and a first link for transmitting security defense messages and a second link for transmitting other messages not belonging to security defense messages, public keys and encrypted AES keys are provided between any two mobile nodes.

The first link is independent of the second link, which do not influence each other and transmit their own information independently. At the same time, because the first link only transmits security defense messages, it avoids the redundancy of transmitting a large number of kinds of information by the second link, and has the characteristics of light weight and easy management.

Each mobile node is loaded with a security defense unit, which comprises a private key, a public key, an RSA encryption module, an RSA decryption module, a Hash module, a digital signature module, an AES key, an AES encryption module, an AES decryption module, a digital signature verification module, an abnormal message feature library, a feature matching module, a TCP/IP filter module, an S.M.A.R.T module, a supervision engine module and a special broadcast queue module, wherein:

the RSA encryption module is configured to encrypt the AES key;

the RSA decryption module is configured to decrypt the encrypted AES key;

the Hash module is configured to acquire message digest of the message;

the digital signature module is configured to sign the message digest;

the AES encryption module is configured to perform AES encryption on the message;

the AES decryption module is configured to decrypt the AES encrypted message with the digital signature;

the digital signature verification module is configured to strip the digital signature on the message; decrypt the signature of the digitally signed message digest; and verify whether the message digest that has been decrypted its signature is the same as the message digest of the decrypted message stripped of the digital signature which is acquired by the Hash module;

the abnormal message feature library is configured to store a plurality of abnormal message features;

the feature matching module is configured to match the message with the abnormal message features in the abnormal message feature library;

the TCP/IP filter module is configured to filter out abnormal messages;

the S.M.A.R.T module is configured to monitor the hardware state about whether the new node to be added to the dual-link wireless ad hoc network in the emergency scene is invaded and whether there is hardware failure;

the supervision engine module is configured to judge the message received by the destination node and unsuccessfully matched with the feature matching module; add the features of abnormal messages which are unsuccessfully matched with the feature matching module to the special broadcast queue module and the abnormal message feature library loaded on the destination node; check the identity and hardware state of the new node to be added to the dual-link wireless ad hoc network in the emergency scene; authorize the new node without abnormality; and add authorization result information to the special broadcast queue module loaded on the destination node;

the special broadcast queue module is configured to encapsulate the features of abnormal messages which are unsuccessfully matched with the feature matching module and the authorization result information into security defense messages, and broadcast the security defense messages to all mobile nodes except the destination node in the dual-link wireless ad hoc network in the emergency scene through the first link.

By loading a security defense unit on each mobile node, the purpose of distributed intrusion detection can be achieved, so that even if the network is paralyzed in a large area, any mobile node can still independently carry out security defense, prevent malicious behavior of attackers and improve the invulnerability of the network.

The TCP/IP filter module directly filters out the abnormal messages successfully matched with the feature matching module, which embodies the application of misuse detection in intrusion detection technology and gives full play to the advantage of fast detection speed; the supervision engine module uses the deep learning algorithm to judge the messages that are not successfully matched with the feature matching module, which embodies the application of abnormal detection and gives full play to the advantages of intelligent detection that can judge unknown types of messages. Through the mixed detection method of misuse detection and abnormal detection, the advantages of the two detection methods can be integrated and the detection rate can be improved.

Figure 2:
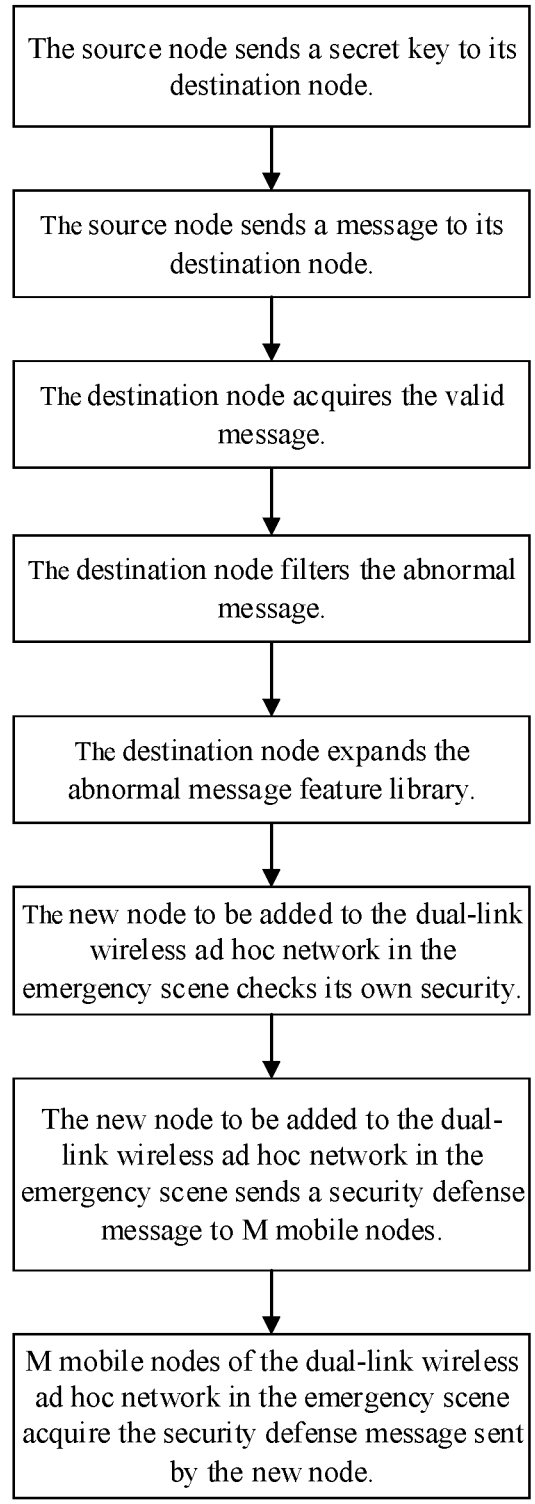
FIG. 2 is an implementation flow chart of a security defense method for a dual-link wireless ad hoc network in an emergency scene according to the present disclosure.

With reference to FIG. 2, the security defense method according to the present disclosure includes the following steps of:

Step 1) a source node $n_1$ sends a secret key to its destination node $n_9$, wherein:

the RSA encryption module loaded on the source node $n_1$ encrypts the AES key Z through a private key Y of $n_1$ to obtain the encrypted AES key, and sends Z1 and the public key X of the source node $n_1$ to the destination node $n_9$ through the second link, in the transmission process, because the destination node $n_9$ is not in the communication range of the source node $n_1$, the destination node $n_9$ sends the key to the source node $n_1$ through the forwarding of intermediate nodes $n_4$ and $n_6$.

The RSA encryption module encrypts the AES key Z, so that it is difficult to crack the AES key Z and the security of AES encryption itself is improved.

Figure 3:
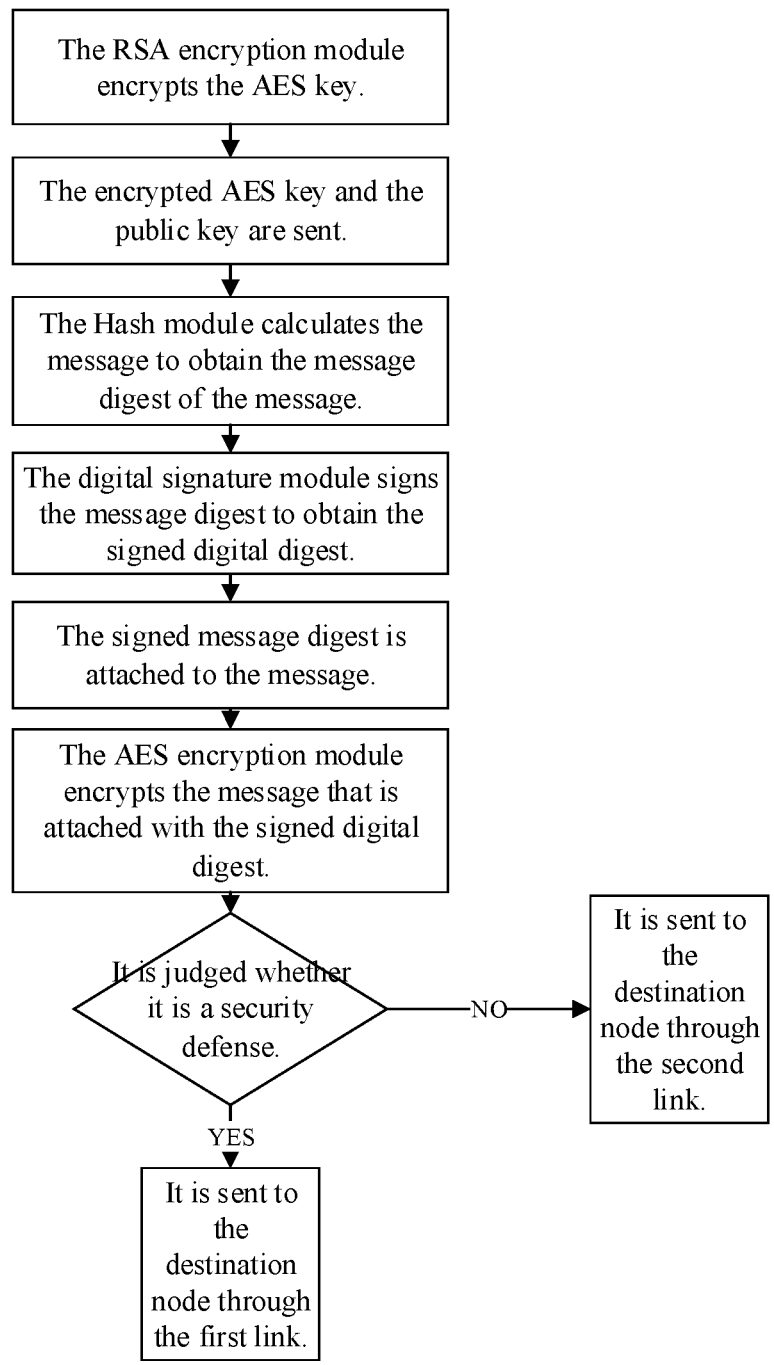
FIG. 3 is an implementation flow chart of sending messages from a source node to a destination node according to the present disclosure.

Step 2) The source node $n_1$ sends a message to its destination node $n_9$, and its implementation flow is shown in FIG. 3.

Step 2a) the Hash module loaded on the source node $n_1$ calculates the message A to be sent by the source node $n_1$, and takes the calculated hash value as the message digest B of the message A, wherein the calculation method of Hash module is to map the message A into a unique, irreversible, fixed-length and compact string, which is a hash value.

Step 2b) the digital signature module loaded on the source node $n_1$ signs the message digest B through the private key Y of the source node $n_1$ to obtain a digital signature C of B, and attaches the digital signature C to the message A to obtain the message D with the digital signature.

Step 2c) the AES encryption module loaded on the source node $n_1$ encrypts D through the AES key Z of the source node $n_1$ to obtain an AES encrypted message E.

The manner of mixing encryption of combining RSA asymmetric encryption with AES symmetric encryption and digital signature gives play to the advantage that it is difficult to crack RSA asymmetric encryption with two different keys and it is easy to distribute keys, the advantage that the AES symmetric encryption is fast in encryption speed and is suitable for encrypting a large number of data, and the advantage that digital signature can verify the authenticity of messages, so that it is difficult for attackers to crack and tamper with messages and the security and the anti-counterfeiting performance of messages is improved.

Step 2d) if the AES encrypted message E is a security defense message, the source node $n_1$ sends the message to the destination node $n_9$ through the first link; if the AES encrypted message E is another message, the source node $n_1$ sends the message to the destination node $n_9$ through the second link; in the transmission process, since the destination node $n_9$ is not in the communication range of the source node $n_1$, the source node $n_1$ sends the message to the destination node $n_9$ through the forwarding of the intermediate nodes $n_4$ and $n_6$.

Figure 4:
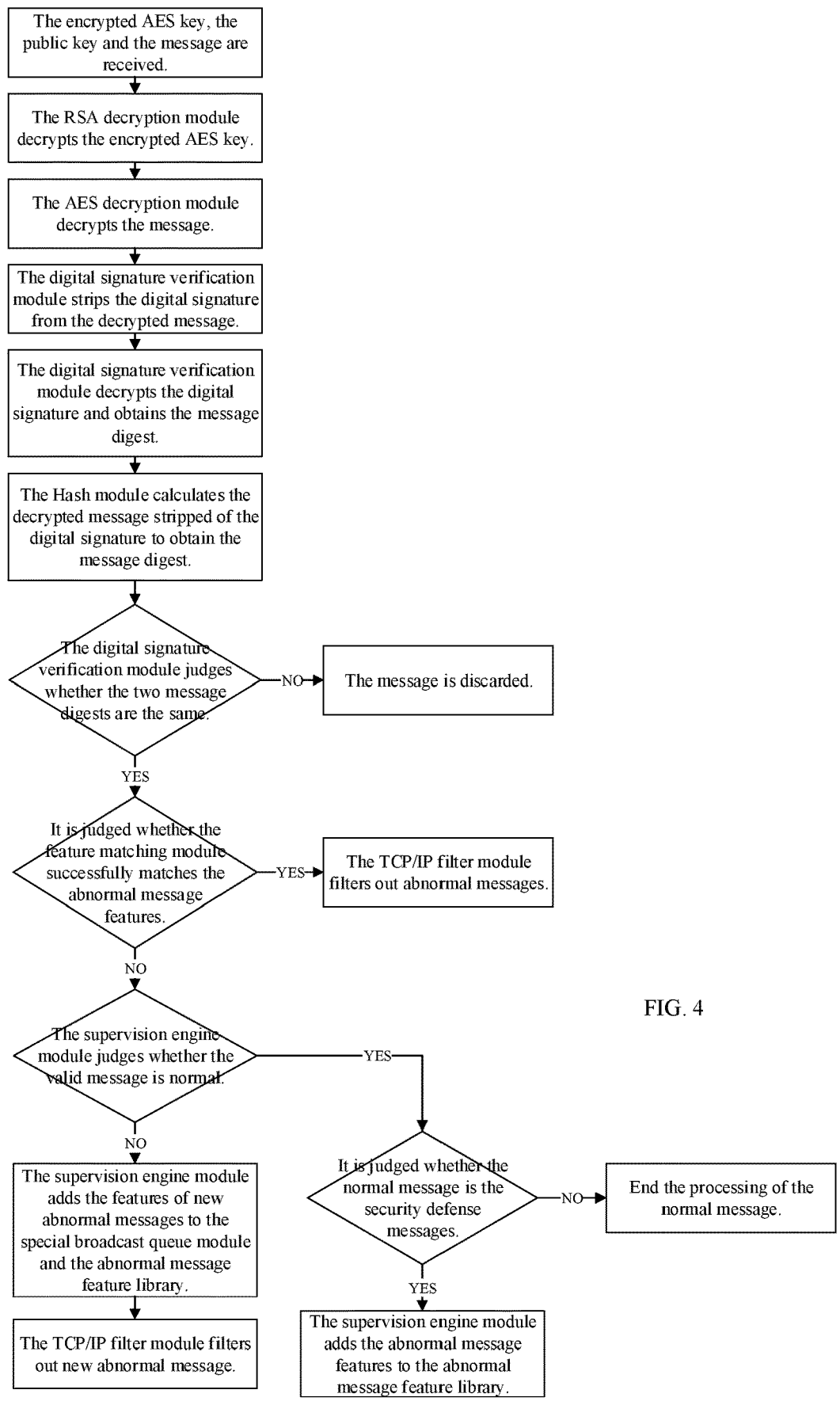
FIG. 4 is an implementation flow chart of a destination node processing the received message according to the present disclosure.

The implementation flow of the destination node processing the received message from Step 3) to Step 5) is shown in FIG. 4.

Step 3) the destination node $n_9$ acquires the valid message.

Step 3a) the destination node $n_9$ receives the encrypted AES key Z1 sent by the source node $n_1$, the public key X of the source node $n_1$ and the AES encrypted message E.

Step 3b) the RSA decryption module loaded on the destination node $n_9$ decrypts the encrypted AES key Z1 through the public key X of the source node $n_1$ to obtain the decrypted AES key Z2.

Step 3c) the AES decryption module loaded on the destination node $n_9$ decrypts the AES encrypted message E through Z2 to obtain the AES decrypted message E'.

Step 3d) the digital signature verification module loaded on the destination node $n_9$ strips the AES decrypted message E' to obtain the message D' and the digital signature C' of E'.

Step 3e) the digital signature verification module loaded on the destination node $n_9$ decrypts the digital signature C' of E' through the public key X of the source node $n_1$ to obtain message digest P.

Step 3f) the Hash module loaded on the destination node $n_9$ calculates the message D' and takes the calculated hash value as the message digest Q, wherein the calculation method of Hash module is to map the message D' into a unique, irreversible, fixed-length and compact string, which is a hash value.

Step 3g) the digital signature verification module loaded on the destination node $n_9$ judges whether the message digest P is the same as the message digest Q, if so, the message sent by the source node $n_1$ is consistent with the message received by the destination node $n_9$, that is, the message received by $n_9$ is a valid message, otherwise, the message received by $n_9$ is an invalid message.

The consistency between the message sent by the source node $n_1$ and the message received by the destination node $n_9$ is verified by the digital signature verification module, which indicates that the message sent by the source node $n_1$ has not been tampered by the attacker in the transmission process. Thus, the message is a valid message after being received by the destination node $n_9$, and the next process can be continued. If the digital signature verification module judges that the message sent by the source node $n_1$ is inconsistent with the message received by the destination node $n_9$, it indicates that the message sent by the source node $n_1$ has been tampered by the attacker in the transmission process, and the message is an invalid message. And the destination node discards the message and does not perform any operations on the message.

Step 4) the destination node $n_9$ filters the abnormal message.

Step 4a) the feature matching module loaded on the destination node $n_9$ matches the valid message with the abnormal message features in the abnormal message feature library. If they match successfully, the valid message is an abnormal message, and the abnormal message is filtered out to realize the defense against the abnormal message. Otherwise, step 4b) is executed.

Step 4b) the supervision engine module loaded on the destination node $n_9$ judges whether the valid message is normal through deep learning algorithm. If so, the valid message is a normal message. Otherwise, the valid message is a new abnormal message, and the features of the new abnormal message are added to the special broadcast queue module loaded on the destination node $n_9$ and the abnormal message feature library, and the new abnormal message is filtered out at the same time to realize the defense against the new abnormal message; wherein the deep learning algorithm refers to the algorithm that judges whether the valid message is a normal message or an abnormal message through the deep neural network model established by the deep learning algorithm, wherein the deep neural network model has learned the feature of normal messages in the network monitored in history.

In this step, the supervision engine module can quickly broadcast the features of the new abnormal message to other M−1 nodes except the destination node $n_9$, i.e., 17 nodes, through the first link by adding the features of the new abnormal message to the special broadcast queue module loaded on the destination node $n_9$, so that other M−1 nodes have already received the features of the new abnormal message in advance when the new abnormal message arrives, and can filter out the features directly by the TCP/IP filter module loaded on the node, which avoids the judgment process of the supervision engine module loaded on the node, increases the filtering ability of each node and the cooperation among nodes, gives full play to the advantages of distributed intrusion detection, improves the detection efficiency, and achieves the purpose of rapid security defense.

Step 5) the destination node $n_9$ expands the abnormal message feature library.

After receiving the normal message which is the security defense message in step 4b), the destination node $n_9$ adds the abnormal message features in the security defense message to the abnormal message feature library loaded on the destination node $n_9$.

Step 6) the new node to be added to the dual-link wireless ad hoc network in the emergency scene checks its own security.

Because the nodes in the wireless ad hoc network can be disconnected and accessed at any time, it is very easy for attackers to take the chance to be added to the network under this dynamic situation, and then commit further malicious acts. Therefore, it is very important to check the new nodes to be added to the dual-link wireless ad hoc network in the emergency scene.

The new node to be added to the dual-link wireless ad hoc network in the emergency scene is loaded with a security defense unit; its own hardware state is monitored by the S.M.A.R.T module to obtain the hardware state results of whether it is invaded and whether there is hardware failure; the supervision engine module checks whether its own identity and the hardware state monitored by the S.M.A.R.T module are normal. If so, it is authorized by the supervision engine module, and the authorization result information is added to the special broadcast queue module loaded on the new node through the supervision engine module. Otherwise, the new node is refused to be added to the network to realize the defense against the new node with abnormality to be added to the dual-link wireless ad hoc network in the emergency scene, and prevent the occurrence of malicious behavior from the source.

Step 7) the new node to be added to the dual-link wireless ad hoc network in the emergency scene sends a security defense message to M mobile nodes.

The new node to be added to the dual-link wireless ad hoc network in the emergency scene is taken as a source node, and its own encrypted AES key is acquired according to the method in step 1). The encrypted AES key and its own public key are sent to M mobile nodes of the dual-link wireless ad hoc network in the emergency scene through the second link, and its own AES encrypted security defense message is acquired according to the method in step 2) at the same time, and is sent to M mobile nodes of the dual-link wireless ad hoc network in the emergency scene through the first link.

Step 8) M mobile nodes of the dual-link wireless ad hoc network in the emergency scene acquire the security defense message sent by the new node.

M mobile nodes of the dual-link wireless ad hoc network in the emergency scene acquire the valid message sent by the new node according to the method in step 3), and judge whether the valid message is a normal message, an abnormal message or a new abnormal message according to the method in step 4). If the valid message is an abnormal message, the abnormal message is filtered out. If the valid message is a new abnormal message, the features of the new abnormal message are added to the special broadcast queue module loaded on M mobile nodes and the abnormal message feature library, and the new abnormal message is filtered out at the same time. Otherwise, after the authorization result information of the new node in the normal message sent by the new node which is a security defense message is acquired, the new node is allowed to be added to the dual-link wireless ad hoc network in the emergency scene, and the dual-link wireless ad hoc network in the emergency scene of M+1 mobile nodes including the new node is obtained.

What is claimed is:

1. A dual-link wireless ad hoc network in an emergency scene, comprising M+1 mobile nodes, where N={$n_1$, $n_2$, ... $n_i$, ... $n_M$}, M≥3, wherein $n_i$ represents the i-th mobile node, 1≤i≤M, each mobile node serves as both a source node and a destination node of other mobile nodes, as well as an intermediate node between two mobile nodes, and a first link for transmitting security defense messages and a second link for transmitting other messages not belonging to the security defense messages, public keys and encrypted AES keys are provided between any two mobile nodes;

each mobile node is loaded with a security defense unit, which comprises: a private key, a public key, a RSA encryption module, a RSA decryption module, a Hash module, a digital signature module, an AES key, an AES encryption module, an AES decryption module, a digital signature verification module, an abnormal message feature library, a feature matching module, a TCP/IP filter module, a S.M.A.R.T module, a supervision engine module and a special broadcast queue module, wherein:

the RSA encryption module is configured to encrypt the AES key;

the RSA decryption module is configured to decrypt the encrypted AES key;

the Hash module is configured to acquire message digest of a message;

the digital signature module is configured to sign the message digest to generate a digital signature;

the AES encryption module is configured to perform AES encryption on the message;

the AES decryption module is configured to decrypt the AES encrypted message with the digital signature;

the digital signature verification module is configured to strip the digital signature on the message; decrypt the signature of the digitally signed message digest; and verify whether the message digest that has been decrypted its signature is the same as the message digest of the decrypted message stripped of the digital signature which is acquired by the Hash module;

the abnormal message feature library is configured to store a plurality of abnormal message features;

the feature matching module is configured to match the message with the abnormal message features in the abnormal message feature library;

the TCP/IP filter module is configured to filter out abnormal messages;

the S.M.A.R.T module is configured to monitor the hardware state of the new node to be added to the dual-link wireless ad hoc network in the emergency scene;

the supervision engine module is configured to judge the message received by the destination node and unsuccessfully matched with the feature matching module; add the features of abnormal messages which are unsuccessfully matched with the feature matching module to the special broadcast queue module and the abnormal message feature library loaded on the destination node; check an identity and a hardware state of a new node to be added to the dual-link wireless ad hoc network in the emergency scene; authorize the new node without abnormality; and add authorization result information to the special broadcast queue module loaded on the destination node;

the special broadcast queue module is configured to encapsulate the features of abnormal messages which are unsuccessfully matched with the feature matching module and the authorization result information into security defense messages, and broadcast the security defense messages to all mobile nodes except the destination node in the dual-link wireless ad hoc network in the emergency scene through the first link.

2. The dual-link wireless ad hoc network in an emergency scene according to claim 1, wherein the hardware state of the new node to be added to the dual-link wireless ad hoc network in the emergency scene monitored by the S.M.A.R.T module refers to monitoring whether the new node is invaded and whether there is hardware failure.

3. A security defense method for a dual-link wireless ad hoc network in an emergency scene, comprising the steps of:

(1) sending, by a source node $n_i$, a secret key to destination node $n_j$, wherein:

an RSA encryption module loaded on the source node $n_i$ encrypts the AES key Z1 through a private key Y of $n_i$ to obtain an encrypted AES key, and sends Z1 and a public key X of the source node $n_i$ to the destination node $n_j$ through a second link, wherein 1≤i≤M, 1≤j≤M, i≠j;

(2) sending, by the source node $n_i$, a message to the destination node $n_j$, wherein:
- (2a) a Hash module loaded on the source node $n_i$ calculates a hash of a message A to be sent by the source node $n_i$, and takes the calculated hash value as a message digest B of the message A;
- (2b) a digital signature module loaded on the source node $n_i$ signs the message digest B through a private key Y of the source node $n_i$ to obtain a digital signature C of B, and attaches the digital signature C to the message A to obtain the message D with the digital signature;
- (2c) an AES encryption module loaded on the source node $n_i$ encrypts D through the AES key Z of the source node $n_i$ to obtain an AES encrypted message E;
- (2d) if the AES encrypted message E is a security defense message, the source node $n_i$ sends the message to the destination node $n_j$ through a first link; if the AES encrypted message E is another message, the source node $n_i$ sends the message to the destination node $n_j$ through the second link; in the transmission process, if the destination node $n_j$ is not in the communication range of the source node $n_i$, the message is forwarded through an intermediate node;

(3) acquiring, by the destination node $n_j$, the AES encrypted message E, wherein:
- (3a) the destination node $n_j$ receives the encrypted AES key Z1 sent by the source node $n_i$, the public key X of the source node $n_i$ and the AES encrypted message E;
- (3b) the RSA decryption module loaded on the destination node $n_j$ decrypts the encrypted AES key Z1 through the public key X of the source node $n_i$ to obtain the decrypted AES key Z2;
- (3c) the AES decryption module loaded on the destination node $n_j$ decrypts the AES encrypted message E through Z2 to obtain the AES decrypted message E';
- (3d) the digital signature verification module loaded on the destination node $n_j$ strips the AES decrypted message E' to obtain the message D' and the digital signature C' of E';
- (3e) the digital signature verification module loaded on the destination node $n_j$ decrypts the digital signature C' of E' through the public key X of the source node $n_i$ to obtain message digest P;
- (3f) the Hash module loaded on the destination node $n_j$ calculates the message D' and takes the calculated hash value as the message digest Q;
- (3g) the digital signature verification module loaded on the destination node $n_j$ judges whether the message digest P is the same as the message digest Q, if so, the message sent by the source node $n_i$ is consistent with the message received by the destination node $n_j$, that is, the message received by the destination node $n_j$ is a valid message, otherwise, the message received by the destination node $n_j$ is an invalid message;

(4) filtering, by the destination node $n_j$, the abnormal message, wherein:
- (4a) the feature matching module loaded on the destination node $n_j$ matches the valid message with the abnormal message features in the abnormal message feature library, if they match successfully, the valid message is an abnormal message, and the abnormal message is filtered out to realize the defense against the abnormal message, otherwise, step (4b) is executed;
- (4b) the supervision engine module loaded on the destination node $n_j$ judges whether the valid message is normal through deep learning algorithm, if so, the valid message is a normal message, otherwise, the valid message is a new abnormal message, the features of the new abnormal message are added to the special broadcast queue module loaded on the destination node $n_j$ and the abnormal message feature library, and the new abnormal message is filtered out at the same time to realize the defense against the new abnormal message;

(5) expanding, by the destination node $n_j$, the abnormal message feature library, wherein:
after receiving the normal message which is the security defense message in step (4b), the destination node $n_j$ adds the abnormal message features in the security defense message to the abnormal message feature library loaded on the destination node $n_j$;

(6) checking, by the new node to be added to the dual-link wireless ad hoc network in the emergency scene, its own security, wherein:
the new node to be added to the dual-link wireless ad hoc network in the emergency scene is loaded with a security defense unit; its own hardware state is monitored by the S.M.A.R.T module to obtain the hardware state results of whether it is invaded and whether there is hardware failure; the supervision engine module checks whether its own identity and the hardware state monitored by the S.M.A.R.T module are normal. If so, it is authorized by the supervision engine module, and the authorization result information is added to the special broadcast queue module loaded on the new node through the supervision engine module. Otherwise, the new node is refused to be added to the network to realize the defense against the new node with abnormality to be added to the dual-link wireless ad hoc network in the emergency scene;

(7) sending, by the new node to be added to the dual-link wireless ad hoc network in the emergency scene, a security defense message to M mobile nodes, wherein:
the new node to be added to the dual-link wireless ad hoc network in the emergency scene is taken as a source node, and its own encrypted AES key is acquired according to the method in step (1). The encrypted AES key and its own public key are sent to M mobile nodes of the dual-link wireless ad hoc network in the emergency scene through the second link, and its own AES encrypted security defense message is acquired according to the method in step (2) at the same time, and is sent to M mobile nodes of the dual-link wireless ad hoc network in the emergency scene through the first link;

(8) acquiring, by M mobile nodes of the dual-link wireless ad hoc network in the emergency scene, the security defense message sent by the new node, wherein:
M mobile nodes of the dual-link wireless ad hoc network in the emergency scene acquire the valid message sent by the new node according to the method in step (3), and judge whether the valid message is a normal message, an abnormal message or a new abnormal message according to the method in step (4). If the valid message is an abnormal message, the abnormal message is filtered out. If the valid message is a new abnormal message, the features of the new abnormal message are added to the special broadcast queue module loaded on M mobile nodes and the abnormal message feature library, and the new abnormal message is filtered out at the same time. Otherwise, after the authorization result information of the new node in the normal message sent by the new node which is a security defense message is acquired, the new node is allowed to be added to the dual-link wireless ad hoc network in the emergency scene, and the dual-link wireless ad hoc network in the emergency scene of M+1 mobile nodes including the new node is obtained.

4. The security defense method for a dual-link wireless ad hoc network in an emergency scene according to claim 3, wherein the Hash module loaded on the source node $n_i$ in step (2a) calculates the message A to be sent by the source node $n_i$, and the calculation method is that the Hash module loaded on the source node $n_i$ maps the message A into a unique, irreversible, fixed-length and compact string, which is a hash value.

5. The security defense method for a dual-link wireless ad hoc network in an emergency scene according to claim 3, wherein the supervision engine module loaded on the destination node $n_j$ in step (4b) judges whether the valid message is normal through the deep learning algorithm, and the judging method is to judge whether the valid message is normal or abnormal through the deep neural network model established by the deep learning algorithm, wherein a deep neural network model has learned the features of normal messages in the network monitored in history.

\* \* \* \* \*